United States Patent
Yoon et al.

(10) Patent No.: US 12,482,856 B2
(45) Date of Patent: Nov. 25, 2025

(54) SULFIDE SOLID ELECTROLYTE MATERIAL, MANUFACTURING METHOD THEREOF AND BATTERY COMPRISING THE SAME

(71) Applicants: Hyundai Motor Company, Seoul (KR); Kia Corporation, Seoul (KR); Tokyo Institute of Technology, a Japanese National University Corp, Tokyo (JP)

(72) Inventors: Yong Sub Yoon, Seoul (KR); Sasaki Yuki, Kanagawa (JP); Sa Heum Kim, Seoul (KR); Ryoji Kanno, Tokyo (JP); Hori Satoshi, Tokyo (JP)

(73) Assignees: Hyundai Motor Company, Seoul (KR); Kia Corporation, Seoul (KR); Tokyo Institute of Technology, a Japanese National University Corp, Tokyo (JP)

( * ) Notice: Subject to any disclaimer, the term of this patent is extended or adjusted under 35 U.S.C. 154(b) by 492 days.

(21) Appl. No.: 18/159,073

(22) Filed: Jan. 24, 2023

(65) Prior Publication Data
US 2023/0238574 A1    Jul. 27, 2023

(30) Foreign Application Priority Data

Jan. 25, 2022    (JP) .................................. 2022-009753

(51) Int. Cl.
*H01M 10/0562* (2010.01)
*H01M 10/0525* (2010.01)

(52) U.S. Cl.
CPC ... *H01M 10/0562* (2013.01); *H01M 10/0525* (2013.01); *H01M 2220/20* (2013.01); *H01M 2300/0068* (2013.01)

(58) Field of Classification Search
CPC ......... H01M 10/0562; H01M 10/0561; H01M 10/056; H01M 10/0525; H01M 10/052; H01M 10/058; H01M 2220/20; H01M 2300/0068; H01M 2300/0088
See application file for complete search history.

(56) References Cited

U.S. PATENT DOCUMENTS

| | | | |
|---|---|---|---|
| 9,761,908 B2 | 9/2017 | Kato | |
| 9,929,433 B2 | 3/2018 | Kanno et al. | |
| 10,033,065 B2 | 7/2018 | Kanno et al. | |
| 10,305,140 B2 | 5/2019 | Kato et al. | |
| 2015/0333367 A1 | 11/2015 | Kato et al. | |
| 2015/0333368 A1 | 11/2015 | Kato et al. | |
| 2021/0408580 A1* | 12/2021 | Ye | H01M 10/0525 |
| 2022/0009789 A1* | 1/2022 | Yamamoto | H01M 10/0525 |
| 2023/0063684 A1* | 3/2023 | Li | H01M 10/0525 |

FOREIGN PATENT DOCUMENTS

| | | |
|---|---|---|
| JP | S 60-501731 A | 10/1985 |
| JP | 2016-157630 A | 9/2016 |
| JP | 2019-200856 A | 11/2019 |
| KR | 10-1392689 B1 | 5/2014 |

OTHER PUBLICATIONS

B.T. Ahn et al., "Synthesis and Lithium Conductivities of Li2SiS3 and Li4SiS4", Mat. Res. Bull., vol. 24, pp. 889,897 (1989).
B.T. Ahn et al., "Phase behavior and conductivity of Li2SiS3 composition", Solid State Ionics, vol. 46, pp. 237-242 (1991).
N. Kamaya et al., "A lithium superionic conductor", Nature Materials, vol. 10, pp. 682-686 (Sep. 2011).

* cited by examiner

*Primary Examiner* — Raymond Alejandro
(74) *Attorney, Agent, or Firm* — Fox Rothschild LLP

(57) ABSTRACT

Disclosed are a solid electrolyte material including a naturally abundant element as a base, having lithium ion conductivity equal or superior to those of conventional sulfide solid electrolyte materials, being relatively inexpensive, and having a crystal structure, a manufacturing method thereof, and a battery using the same. The solid electrolyte material may include a naturally abundant element as a base, have lithium ion conductivity equal or superior to those of conventional sulfide solid electrolyte materials, be relatively inexpensive, and have a crystal structure. The sulfide solid electrolyte material includes a sulfide compound represented by a formula of $Li_{2-4x-y}Si_{1+x-y}P_yS_3$, and x and y satisfy conditions $-0.040 \leq x \leq 0.095$ and $0.036 \leq y \leq 0.192$.

7 Claims, 11 Drawing Sheets

AC IMPEDANCE MEASUREMENT RESULT OF FIRED PRODUCT $Li_{1.82}SiP_{0.036}S_3$ AT 460°C

| # | x | y | COMPOSITION | | | | IONIC CONDUCTIVITY (S/cm@25°C) |
|---|---|---|---|---|---|---|---|
| | | | Li | Si | P | S | Cold-pressed |
| 1 | 0.036 | 0.036 | 1.820 | 1.000 | 0.036 | 3.000 | $6.46\times10^{-4}$ |

CATHODE LAYER
SOLID ELECTROLYTE LAYER
ANODE LAYER

CATHODE LAYER: $LiNi_{0.6}Co_{0.2}Mn_{0.2}O_2$ COATED WITH $LiNbO_3$ + $Li_2S$-$P_2S_5$ + CARBON + BINDER
SOLID ELECTROLYTE LAYER: $Li_{1.82}SiP_{0.036}S_3$ (FIRED PRODUCT AT 460°C)
ANODE LAYER: $Li_4Ti_5O_{12}$ + $Li_2S$-$P_2S_5$ + CARBON + BINDER

|  | 1$^{ST}$ CYCLE | 2$^{nd}$ CYCLE | 3$^{rd}$ CYCLE |
|---|---|---|---|
| CHARGE CAPACITY[mAh/g] | 206 | 165 | 155 |
| DISCHARGE CAPACITY[mAh/g] | 165 | 155 | 149 |
| CHARGE AND DISCHARGE EFFICIENCY[%] | 80 | 94 | 96 |

SULFIDE SOLID ELECTROLYTE MATERIAL, MANUFACTURING METHOD THEREOF AND BATTERY COMPRISING THE SAME

CROSS-REFERENCE TO RELATED APPLICATION

This application claims under 35 U.S.C. § 119(a) the benefit of priority to Japanese Patent Application No. 2022-009753 filed on Jan. 25, 2022, the entire contents of which are incorporated herein by reference.

TECHNICAL FIELD

The present disclosure relates to a sulfide solid electrolyte material, a manufacturing method thereof and a battery including the same.

BACKGROUND

As increased used of information related devices or communication devices, such as personal computers, video cameras and cellular phones, development of batteries used as power sources of these devices has become more important. Further, in the automobile industry or the like, development of high capacity and high power batteries for electric vehicles or hybrid vehicles is underway. Recently, among various batteries, lithium ion secondary batteries are spotlighted because they have a high energy density.

Lithium ion secondary batteries conventionally include a liquid electrolyte including a flammable organic solvent, and thus require mount of a safety device which suppresses a temperature rise in case of short-circuit or improvement in structure and material so as to prevent occurrence of short-circuit. On the other hand, all-solid-state lithium ion secondary batteries using a solid electrolyte instead of such a liquid electrolyte do not use a flammable organic solvent, and may thus be regarded as facilitating simplification of a safety device and having low manufacturing costs and excellent productivity. However, the all-solid-state lithium ion secondary batteries have a less energy density than the lithium ion secondary batteries using the liquid electrolyte.

Sulfide solid electrolyte materials are known as solid electrolyte materials used in the all-solid-state lithium ion batteries. For example, Li—Si—S-based sulfide solid electrolytes have been reported. Further, such crystalline sulfides have ionic conductivity of about $2 \times 10^{-6}$ to $4 \times 10^{-5}$ S/cm.

In order to achieve high energy density and high input and output of the all-solid-state lithium secondary batteries, a solid electrolyte material having greater ionic conductivity is required. Inorganic solid electrolytes are divided into amorphous materials and crystalline materials. Such a division may be easily confirmed by X-ray diffraction. An amorphous material has a random crystal structure, and thus, characteristic diffraction peaks are not observed in X-ray diffraction, and it is difficult to identify the crystal structure. On the other hand, in case of a crystalline material, diffraction peaks derived from the peculiar crystal structure of the crystalline material itself are observed in X-ray diffraction. Therefore, a lot of information about the crystal structure, such as a lattice constant, may be obtained, and the ion conduction path of the crystalline material may be analyzed. Further, such information is advantageous in terms of quality control at the time of mass production of the material. Therefore, as the inorganic solid electrolyte materials, the crystalline materials have advantages more than the amorphous materials. Further, the crystalline materials need to require naturally abundant elements, and raw material compounds for the crystalline materials need to be inexpensive.

The above information disclosed in this Background section is only for enhancement of understanding of the background of the invention and therefore it may contain information that does not form the prior art that is already known in this country to a person of ordinary skill in the art.

SUMMARY

In preferred aspects, provided is a sulfide solid electrolyte material that includes a naturally abundant element as a base, has lithium ion conductivity equal or superior to conventional sulfide solid electrolyte materials, and has a crystal structure.

Also provided is a manufacturing method of the sulfide solid electrolyte material, and a battery using the sulfide solid electrolyte material.

In an aspect, provided is a solid electrolyte material including a sulfide compound having a formula of $Li_{2-4x-y}Si_{1+x-y}P_yS_3$. x and y satisfy conditions $-0.040 \leq x \leq 0.095$ and $0.036 \leq y \leq 0.192$. The term "sulfide compound" as used herein refers to a compound including sulfur (e.g., elemental sulfur) that may exist as inorganic anion of sulfur with the chemical formula $S^{2-}$ or one or more $S^{2-}$ ions.

The solid electrolyte material may have peaks at diffraction angles (2θ) of at least 15.43°±0.50°, 15.62°±0.50°, 19.49°+0.50°, 20.98°±0.50°, 24.94°±0.50°, 26.99°+0.50°, 27.68°±0.50°, 30.47°±0.50°, 31.04°±0.50°, and 39.55°±0.50° through X-ray powder diffraction using Cu k-a1 radiation having a wavelength of 1.5405 Å in X-rays.

The sulfide solid electrolyte material may have lithium ionic conductivity of about $4.0 \times 10^{-5}$ S/cm or greater at a temperature of 25° C.

In another aspect, provided is a method of manufacturing the solid electrolyte material. The method includes preparing (e.g., synthesizing) an amorphized ionically conductive material by mechanically milling, and heating the amorphized ionically conductive material so as to produce the solid electrolyte material.

In heating the amorphized ionically conductive material, the amorphized ionically conductive material may be heated within a range of about 300° C. to 500° C.

Also provided is a battery including a cathode active material layer including a cathode active material, an anode active material layer including an anode active material, and an electrolyte layer interposed between the cathode active material layer and the anode active material layer. Particularly, at least one of the cathode active material layer, the anode active material layer or the electrolyte layer includes the above-described sulfide solid electrolyte material.

Further provided is a vehicle including the battery as described herein Other aspects of the invention are discussed infra.

BRIEF DESCRIPTION OF THE DRAWINGS

The above and other features of the present invention will now be described in detail with reference to certain exemplary embodiments thereof illustrated in the accompanying drawings which are given hereinbelow by way of illustration only, and thus are not limitative of the present invention, and wherein.

Figure 1A:
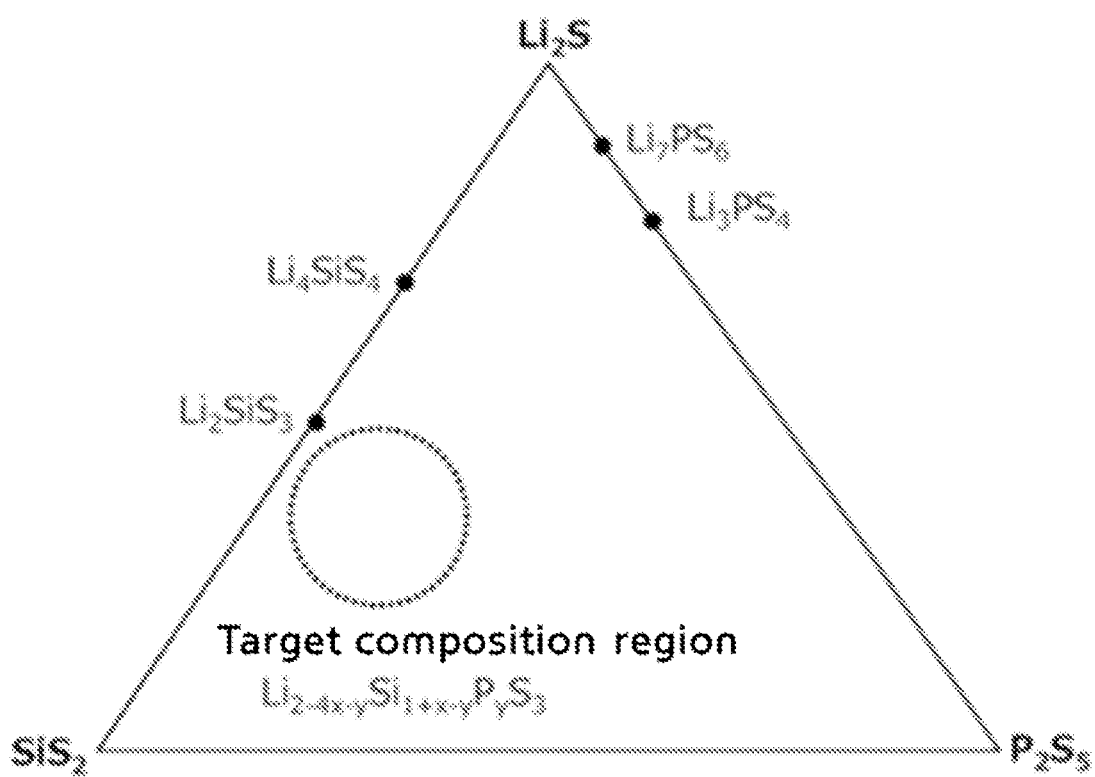
FIG. 1A shows a $Li_2S$—$SiS_2$—$P_2S_5$ ternary diagram illustrating the composition range of an exemplary sulfidebased solid electrolyte according to an exemplary embodiment of the present invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes, will be determined in part by the particular intended application and use environment.

In the figures, reference numbers refer to the same or equivalent parts of the present invention throughout the several figures of the drawings.

DETAILED DESCRIPTION

Hereinafter reference will be made in detail to various embodiments of the present invention, examples of which are illustrated in the accompanying drawings and described below. While the invention will be described in conjunction with exemplary embodiments, it will be understood that present description is not intended to limit the invention to the exemplary embodiments. On the contrary, the invention is intended to cover not only the exemplary embodiments, but also various alternatives, modifications, equivalents and other embodiments, which may be included within the spirit and scope of the invention as defined by the appended claims.

Like reference numbers refer to like elements throughout the description of the figures. In the drawings, the sizes of structures may be exaggerated for clarity. It will be understood that, although the terms "first", "second", etc. may be used herein to describe various elements, these elements should not be construed as being limited by these terms, which are used only to distinguish one element from another. For example, within the scope defined by the present invention, a "first" element may be referred to as a "second" element, and similarly, a "second" element may be referred to as a "first" element. Singular forms are intended to encompass the plural meaning as well, unless the context clearly indicates otherwise.

It will be further understood that terms such as "comprise" or "has", when used in this specification, specify the presence of stated features, integers, steps, operations, elements, components or combinations thereof, but do not preclude the presence or addition of one or more other features, integers, steps, operations, elements, components, or combinations thereof. In addition, it will be understood that, when an element such as a layer, film, region or substrate is referred to as being "on" another element, it can be directly on the other element, or an intervening element may also be present. It will also be understood that when an element such as a layer, film, region or substrate is referred to as being "under" another element, it can be directly under the other element, or an intervening element may also be present.

Unless the context clearly indicates otherwise, all numbers, figures, and/or expressions that represent ingredients, reaction conditions, polymer compositions, and amounts of mixtures used in the specification are approximations that reflect various uncertainties of measurement occurring inherently in obtaining these figures, among other things. For this reason, it should be understood that, in all cases, the term "about" should be understood to modify all such numbers, figures and/or expressions. Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

In addition, when numerical ranges are disclosed in the description, these ranges are continuous, and include all numbers from the minimum to the maximum, including the maximum within each range, unless otherwise defined. Furthermore, when the range refers to an integer, it includes all numbers from the minimum to the maximum, including the maximum within the range, unless otherwise defined.

It should be understood that, in the specification, when a range is referred to regarding a parameter, the parameter encompasses all figures including end points disclosed within the range. For example, the range of "5 to 10" includes figures of 5, 6, 7, 8, 9, and 10, as well as arbitrary sub-ranges, such as ranges of 6 to 10, 7 to 10, 6 to 9, and 7 to 9, and any figures, such as 5.5, 6.5, 7.5, 5.5 to 8.5, and 6.5 to 9, between appropriate integers that fall within the range. In addition, for example, the range of "10% to 30%" encompasses all integers that include numbers such as 10%, 11%, 12%, and 13%, as well as 30%, and any sub-ranges, such as 10% to 15%, 12% to 18%, or 20% to 30%, as well as any numbers, such as 10.5%, 15.5%, and 25.5%, between appropriate integers that fall within the range.

A term "all-solid-state battery" as used herein refers to a rechargeable secondary battery that includes an electrolyte in a solid state, e.g., gel or polymer (cured), which may include an ionomer and other electrolytic components for transferring ions between the electrodes of the battery.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Hereinafter, a sulfide solid electrolyte material according to the present invention will be described in detail, but the present invention is not limited to the following embodiments.

In an aspect, provided is a solid electrolyte material (e.g., sulfide solid electrolyte material).

The sulfide solid electrolyte material may have more excellent lithium ion conductivity may include a novel crystal structure.

Composition

The solid electrolyte material includes a sulfide compound having a formula $Li_{2-4x-y}Si_{1+x-y}P_yS_3$, and x and y satisfy conditions $-0.040 \leq x \leq 0.095$ and $0.036 \leq y \leq 0.192$.

FIG. 1A shows a $Li_2S$—$SiS_2$—$P_2S_5$ ternary diagram. As the base of the sulfide solid electrolyte material, equilibrium-$Li_2SiS_3$ or metastable-$Li_2SiS_3$, which is conventionally known, is used. The compound having a formula of $Li_2SiS_3$ is located at the center of the left side of a triangle indicating the ternary diagram of FIG. 1A, and, in other words, is located at the halfway point between the upper apex (indicating $Li_2S$) of the triangle and the left apex (indicating $SiS_2$) of the triangle, and has a composition ratio of $Li_2S:SiS_2=50:50$ (molar ratio). The impurity $Li_4SiS_4$ is easily precipitated, and thus, it is easy to acquire a single phase in case of a $SiS_2$ rich composition. For example, the position of the composition may be shifted to the left apex (indicating $SiS_2$) of the triangle in the triangle of the ternary diagram. In the composition formula $Li_{2-4x-y}Si_{1+x-y}P_yS_3$, x is increased.

Further, when the position of the composition is shifted to the right apex (indicating $P_2S_5$) of the triangle of the ternary diagram, the composition ratio of $P_2S_5$ is increased. In this case, crystallinity and lithium ionic conductivity may be improved. However, the ratio of $P_2S_5$ may be excessively high, impurity $Li_4P_2S_6$ having a low lithium ionic conductivity may be precipitated, and thus, lithium ionic conductivity may be decreased. For example, $Li_3PS_4$ or $Li_7PS_6$ is known as a phosphorus (P)-based sulfide solid electrolyte material, and phosphorus (P), which is one of elements of the phosphorus (P)-based sulfide solid electrolyte material, is present in a mass ratio of only 0.1% (11$^{th}$ in abundance) in the earth's crust. On the other hand, silicon (Si) is the second most abundant element, which is present in a mass ratio of 27% in the earth's crust, and is advantageous in terms of resources. On this basis, in the composition formula $Li_{2-4x-y}Si_{1+x-y}P_yS_3$, y is prescribed within a proper range.

Figure 1B:
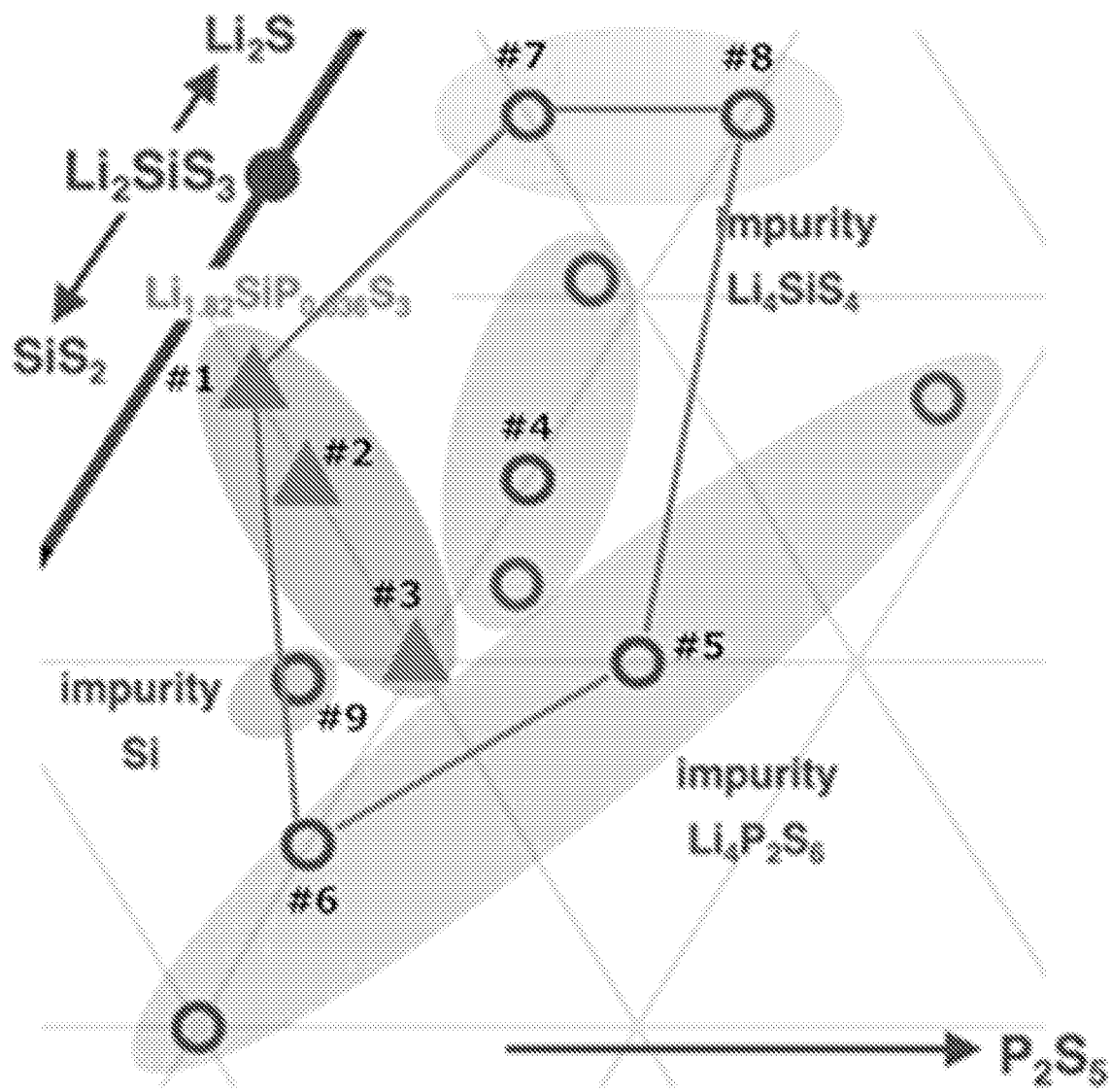
FIG. 1B shows a target composition region of FIG. 1A.

Based on the above guidelines, in the composition formula $Li_{2-4x-y}Si_{1+x-y}P_yS_3$, x and y satisfy conditions $-0.040 \leq x \leq 0.095$ and $0.036 \leq y \leq 0.192$. FIG. 1B shows an enlarged view of the target composition region of FIG. 1A, a region acquired by connecting a point #1, a point #7, a point #8, a point #5 and a point #6 in order is the corresponding target composition region. The inventors of the present invention discovered that the sulfide solid electrolyte having a novel crystal structure is acquired within this composition range.

Measurement Through X-Ray Diffraction Analysis

The solid electrolyte material may have peaks at diffraction angles (2θ) of at least 15.43°±0.50°, 15.62°±0.50°, 19.49°±0.50°, 20.98°±0.50°, 24.94°±0.50°, 26.99°±0.50°, 27.68°±0.50°, 30.47°±0.50°, 31.04°±0.50°, and 39.55°±0.50° through X-ray diffraction using Cu k-α1 radiation having a wavelength of 1.5405 Å in X-rays. The X-ray diffraction peaks are determined by the crystal structure.

Figure 2:
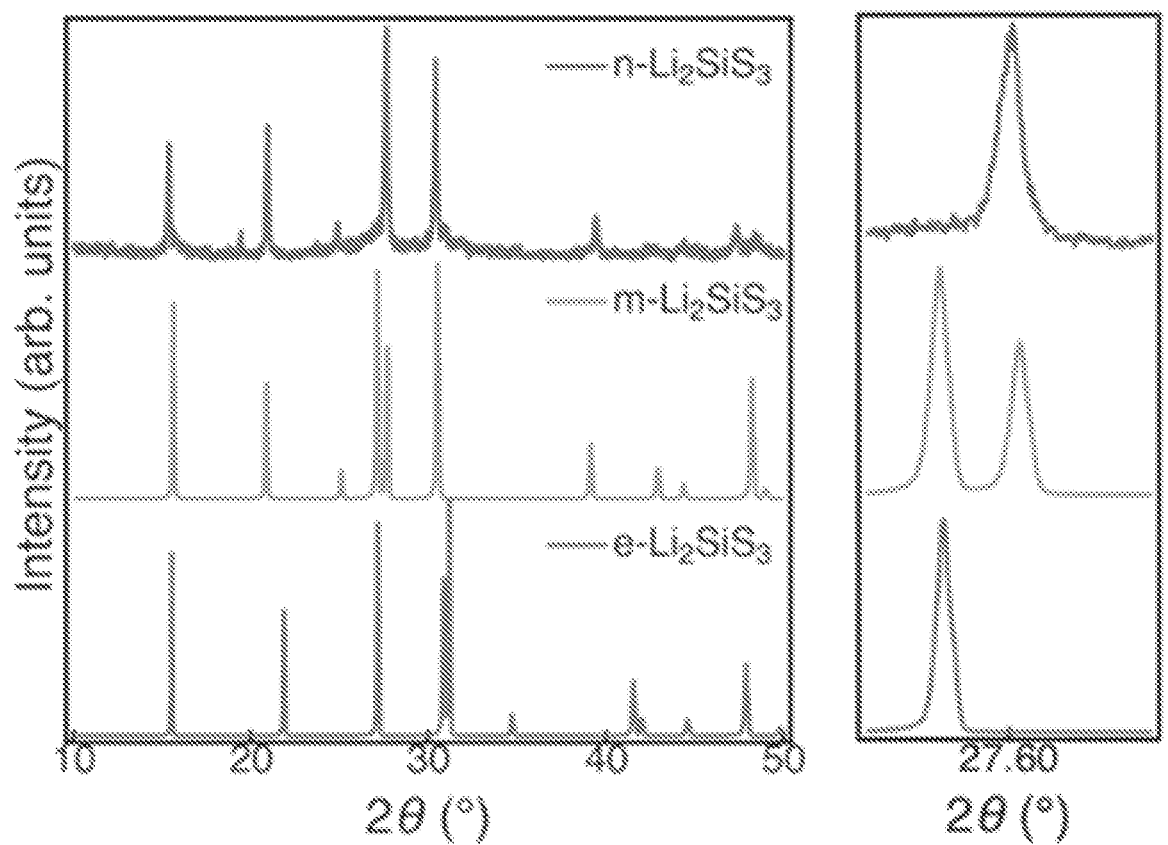
FIG. 2 shows results of X-ray diffraction analysis of an exemplary sulfide solid electrolyte material according to an exemplary embodiment of the present invention, and equilibrium-$Li_2SiS_3$ and metastable-$Li_2SiS_3$, which are conventionally known.

FIG. 2 shows results of X-ray diffraction analysis the sulfide solid electrolyte material according to an exemplary embodiment of the present invention, and equilibrium-$Li_2SiS_3$ and metastable-$Li_2SiS_3$, which are conventionally known.

As shown in FIG. 2, n-$Li_2SiS_3$ indicates the sulfide solid electrolyte material according to an exemplary embodiment of the present invention, m-$Li_2SiS_3$ indicates metastable-$Li_2SiS_3$, and e-$Li_2SiS_3$ indicates equilibrium-$Li_2SiS_3$. The right part of FIG. 2 represents an enlarged graph of a portion around the X-ray diffraction angle (2θ) of 26-28°, and indicates that the sulfide solid electrolyte material according to one embodiment of the present invention has different peaks from equilibrium-$Li_2SiS_3$ and metastable-$Li_2SiS_3$, which are conventionally known, and has a novel crystal structure. Further, it is considered that a crystal structure relates to lithium ionic conductivity, and the novel crystal structure may acquire lithium ionic conductivity which exceeds those of equilibrium-$Li_2SiS_3$ and metastable-$Li_2SiS_3$, which are conventionally known.

Lithium Ionic Conductivity

The sulfide solid electrolyte material may acquire lithium ionic conductivity of about $4.0 \times 10^{-5}$ S/cm or greater, when the AC impedance of the sulfide solid electrolyte material in a powdery phase is measured at a temperature of 25° C. The lithium ionic conductivity of the sulfide solid electrolyte material may be preferably about $7.0 \times 10^{-5}$ S/cm or greater, or particularly about $1.0 \times 10^{-4}$ S/cm or greater. Further, the lithium ionic conductivities of equilibrium-$Li_2SiS_3$ and metastable-$Li_2SiS_3$, which are conventionally known, are $4 \times 10^{-6}$ S/cm and $2 \times 10^{-5}$ S/cm, respectively, and the sulfide solid electrolyte material according to an exemplary embodiment of the present invention has an excellent lithium ionic conductivity which exceeds the lithium ionic conductivities of equilibrium-$Li_2SiS_3$ and metastable-$Li_2SiS_3$.

Manufacturing Method

Figure 3:
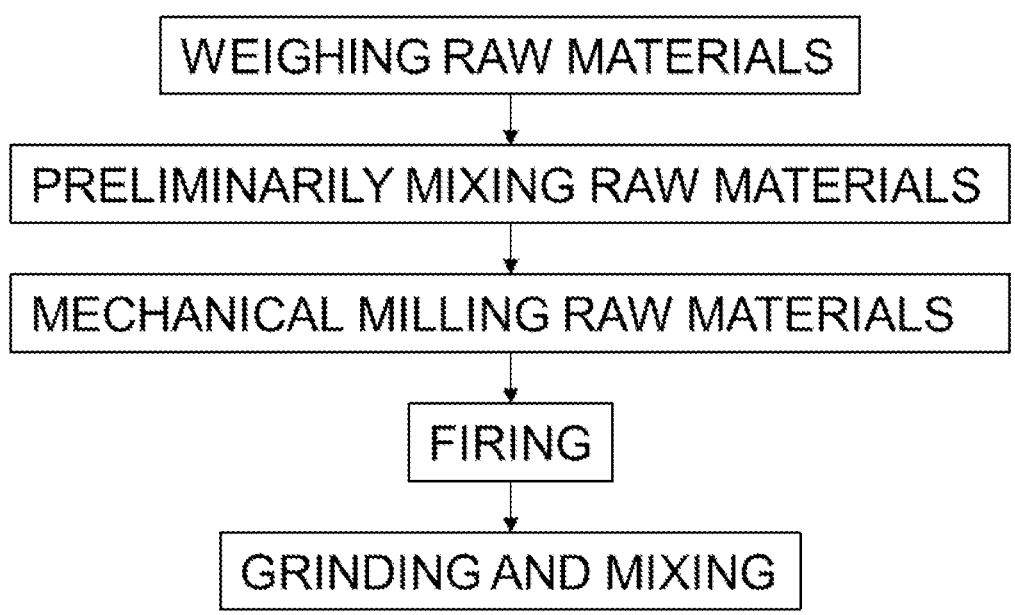
FIG. 3 shows an exemplary manufacturing method of the sulfide solid electrolyte material according to an exemplary embodiment of the present invention.

The sulfide solid electrolyte material may be manufactured by the following method, without being limited thereto. FIG. 3 shows an exemplary manufacturing method of the sulfide solid electrolyte material according to an exemplary embodiment of the present invention. The manufacturing method of the sulfide solid electrolyte material may include a process of preparing (e.g., synthesizing) an ionically conductive material which is amorphized by mechanical milling, and a process of heating or firing the amorphized ionically conductive material so as to produce the sulfide solid electrolyte material. Hereinafter, the manufacturing method of the sulfide solid electrolyte material will be described in detail.

Elemental Li, elemental Si, elemental P and elemental S may be weighed to form a desired composition. As raw materials to supply the respective elements, $Li_2S$, $SiS_2$ and $P_2S_5$, which are sulfides of element Li, element Si and element P, may be used. Further, the raw materials having large particle sizes may be ground in advance. As shown in FIG. 3, $Li_2S$, $SiS_2$ and $P_2S_5$ are weighed to form the desired composition, and are preliminarily mixed using an agate mortar, before mechanical milling.

Process of Synthesizing Ionically Conductive Material

The amorphized ionically conductive material may be synthesized by mechanical milling the raw materials.

Mechanical milling may be grinding a sample while applying mechanical energy thereto. The amorphized ionically conductive material may be synthesized by applying mechanical energy to the raw materials. Mechanical milling may be performed, for example, using a ball mill, a vibration mill, a turbo mill, a mechano-fusion system, a disc mill or the like, and, particularly, among these devices, the vibration mill or the ball mill may be used.

The conditions of the ball mill are not particularly limited as long as the amorphized ionically conductive material may be acquired. In general, the generation rate of the ionically conductive material is increased as the RPM of the ball mill is increased, and the conversion rate from a raw material composition to the ionically conductive material is increased as a processing time is lengthened. When mechanical milling is performed using a planetary ball mill, the RPM of a disc may be within the range of, for example, about 200 RPM to 500 RPM, and particularly, about 300 RPM to 400 RPM.

The conditions of the vibration mill are not particularly limited as long as the amorphized ionically conductive material may be acquired. The vibration amplitude of the vibration mill may be within the range of, for example, about 5 mm to 15 mm, and particularly, about 6 mm to 10 mm. The vibration frequency of the vibration mill may be within the range of, for example about 500 RPM to 2,000 RPM, and particularly, about 1,000 RPM to 1,800 RPM. The charging rate of the vibration mill with a sample may be within the range of, for example, about 1 vol % to 80 vol %, particularly, about 5 vol % to 60 vol %, and more particularly, about 10 vol % to 50 vol %. Further, a vibrator (for example, an alumina vibrator) may be used in the vibration mill.

The processing time in mechanical milling may be about 30 hours or more so as to synthesize the amorphized ionically conductive material. When the processing time is less than about 30 hours, uniformity of the respective elements of the acquired amorphized ionically conductive material (referred to hereinafter as a precursor) is reduced, and thus, impurities may be precipitated during firing or the crystallinity of a fired product may be reduced and/or the lithium ionic conductivity of the fired product may be reduced. The upper limit of the processing time is not particularly limited, and may be equal to or less than 96 hours or may be equal to or less than about 72 hours because improvement in uniformity, crystallinity, lithium ionic conductivity, etc. is saturated.

Process of Heating Amorphized Ionically Conductive Material

The sulfide solid electrolyte material having the crystal structure may be acquired by heating (firing) the amorphized ionically conductive material (i.e., the precursor).

The precursor may be pelletized, and may be heated in the state in which precursor pellets are vacuum-sealed in a quartz tube. Thereby, oxidation of the precursor, or change in the composition of the precursor due to volatilization of some of the raw materials may be prevented.

Figure 4:
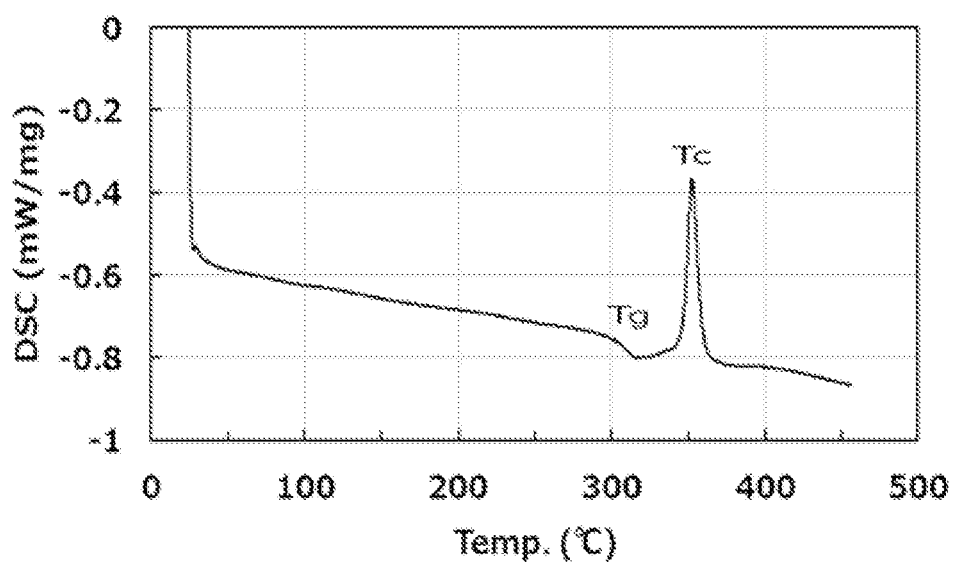
FIG. 4 shows a graph representing results of one example of differential scanning calorimetry.

The heating temperature may be equal to or higher than 300° C. By setting the heating temperature to about 300° C. or higher, the above-described novel crystal phase may be easily precipitated. Particularly, the heating temperature may be equal to or higher than about 350° C. FIG. 4 shows a graph representing results of one example of differential scanning calorimetry of the amorphized ionically conductive material (i.e., the precursor). Glass transition at a temperature of about 300° C. (Tg) and a crystallinity peak at a temperature of about 350° C. (Tc) are observed. Thereby, it may be confirmed that the crystal phase is precipitated above a temperature of about 300° C.

The upper limit of the heating temperature may be raised in terms of increase in crystallinity, and may be about 450° C.±50° C. When the heating temperature is above about 500° C., equilibrium-$Li_2SiS_3$ or $Li_4SiS_4$ is precipitated and thus lithium ionic conductivity may be reduced.

Figure 5:
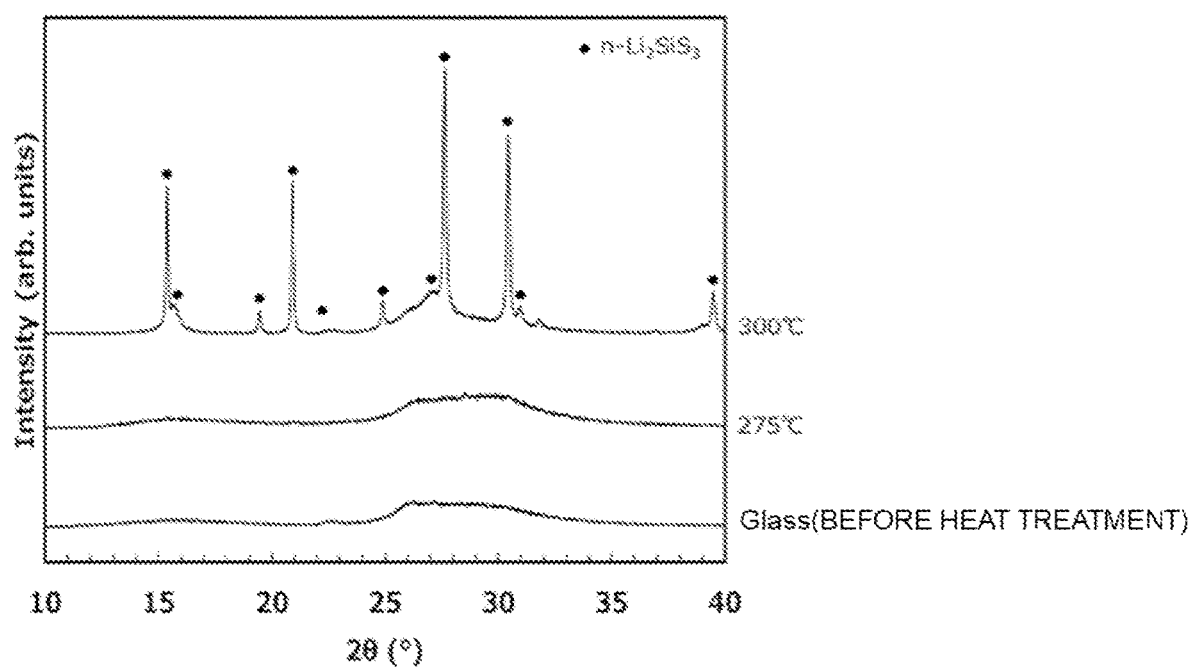
FIG. 5 shows results of X-ray diffraction analysis of sulfide solid electrolyte materials acquired from an amorphous precursor at different heating temperatures (also referred to as heat-treatment temperatures)
Figure 6:
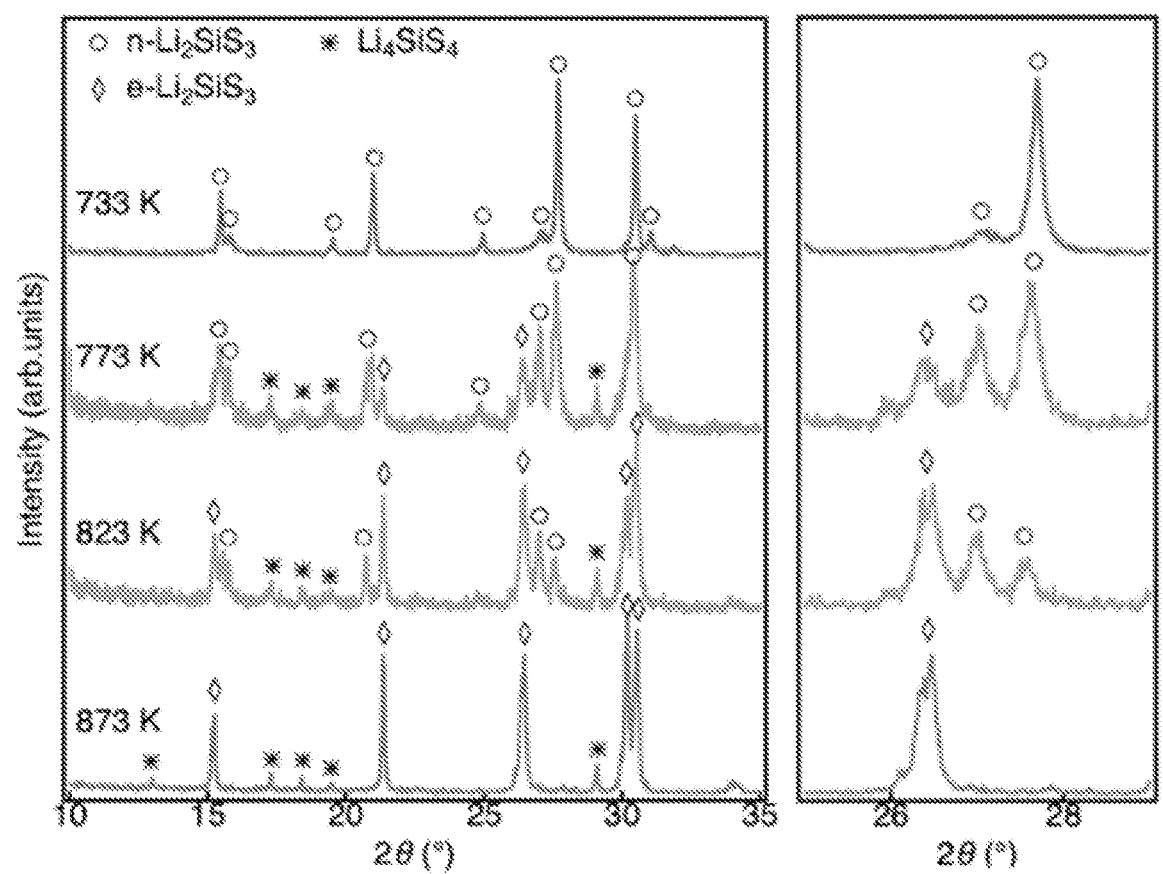
FIG. 6 shows results of X-ray diffraction analysis of sulfide solid electrolyte materials acquired at heating temperatures (also referred to as heat-treatment temperatures) of 460° C. (733 K) or higher.

FIG. 5 shows results of X-ray diffraction analysis of sulfide solid electrolyte materials acquired at different heating temperatures (also referred to as heat-treatment temperatures), and an acquired crystal structure may be varied depending on the heating temperatures (i.e., the heat-treatment temperatures). It may be confirmed that the sample acquired at a heating temperature of about 275° C. is amorphous in the same way as the state of the sample before heat treatment, but the sample acquired at a heating temperature of about 300° C. has peaks (·) indicating the novel crystal phase. Further, FIG. 6 shows results of X-ray diffraction analysis of exemplary sulfide solid electrolyte materials, acquired at temperatures of about 460° C. (733 K) or higher. When the sulfide solid electrolyte material is acquired at a temperature of about 500° C. (773 K), equilibrium-$Li_2SiS_3$ and $Li_4SiS_4$ easily emerge, and, when the sulfide solid electrolyte material is acquired at a temperature of about 600° C. (873 K), the sulfide solid electrolyte material is structurally completely changed to the equilibrium phase. Further, equilibrium-$Li_2SiS_3$ or metastable-$Li_2SiS_3$, which are conventionally known, is melted into a solution by heat treatment at a temperature of about 1,000° C., the former is acquired by maintaining the melted solution at a temperature of about 720° C. for about 12 hours and then naturally cooling the solution, and the latter is acquired by cooling the melted solution to room temperature over about 5 hours to 6 hours.

On the basis of the above description, the heating temperature may be within the range of about 300° C. to 500° C. Within this temperature range, the sulfide solid electrolyte material according to one embodiment of the present invention, which does not include equilibrium-$Li_2SiS_3$ and $Li_4SiS_4$, and has the novel crystal structure, may be acquired.

In a series of processes included in the manufacturing method, in order to prevent raw material powder, precursor powder and the acquired sulfide solid electrolyte material from being hydrolyzed by moisture in the air, these processes may be performed in a glove box or the like under an inert gas atmosphere using argon or the like.

Battery

The sulfide solid electrolyte material has lithium ionic conductivity, and may thus be used for arbitrary purposes requiring lithium ionic conductivity. In particular, the sulfide solid electrolyte material may be particularly used in batteries, because, inter cilia, the sulfide solid electrolyte material may contribute greatly to acquisition of high performance of batteries.

A battery according to an exemplary embodiment of the present invention includes a cathode active material layer including a cathode active material, an anode active material layer including an anode active material, and an electrolyte layer interposed between the cathode active material layer and the anode active material layer. At least one of the cathode active material layer, the anode active material layer and the electrolyte layer includes the above-descried sulfide solid electrolyte material according to one embodiment of the present invention.

According to various exemplary embodiments of the present invention, the sulfide solid electrolyte material may have good lithium ionic conductivity. Therefore, the battery according to various exemplary embodiments of the present invention, which includes the above-descried sulfide solid electrolyte material, may be used as a solid battery having good lithium ionic conductivity.

Moreover, considering that the sulfide solid electrolyte material is actually used in a battery, even though it is verified that the sulfide solid electrolyte material has good lithium ionic conductivity, the battery may be stably charged and discharged and deterioration of the performance (i.e., the charge and discharge capacities) of the battery is less when the sulfide solid electrolyte material is used in the battery. The battery using the sulfide solid electrolyte material according to various exemplary embodiments of the present invention may be stably operated and have less deterioration of the charge capacity, for example, even when a charging test to simulate real driving is performed, and is thus desirable.

The cathode active material, the anode active material and the electrolyte layer are not limited to specific materials, and may employ any materials which are employed in general batteries as long as they do not affect the operation and effects of the present invention.

EXAMPLES

Hereinafter, the present invention will be described in more detail through the following examples. The following examples serve merely to exemplarily describe the present invention, and are not intended to limit the scope of the invention.

Manufacture of Samples

In a glove box under an argon atmosphere, $Li_2S$, $SiS_2$ and $P_2S_5$ serving as starting raw materials were weighed to form desired compositions, were ground and mixed using an agate mortar, and went through mechanical milling using a ball mill for 40 hours, and thereby, amorphous materials (precursors) were synthesized. Pellets having a particle size of about 13 mm were formed by putting the acquired precursors into a pelletizer and applying a pressure of about 20 MPa to the pelletizer using a 1-axis press machine. The pellets were sealed in an approximately vacuum state of about 10 Pa in a quartz tube coated with carbon. Thereafter, the quartz tube in which the pellets were placed was heated to a temperature of about 300 to 500° C., was kept for about 8 hours, and was naturally cooled. Further, for the purpose of subsequent evaluation, the particle size of the pellets was adjusted by sufficiently griding the pellets using the agate mortar. The compositions of synthesized samples are set forth in Table 1 below, and the respective compositions of the samples correspond to the points #1 to #9 shown in FIG. 1B which illustrates the target composition region.

TABLE 1

| # | x | y | Composition Li | Si | P | S | Lithium ionic conductivity ($10^{-4}$ S/cm @ 25° C.) Product acquired at 300° C. | Product acquired at 500° C. |
|---|---|---|---|---|---|---|---|---|
| 1 | 0.036 | 0.036 | 1.820 | 1.000 | 0.036 | 3.000 |  | 2.80 |
| 2 | 0.044 | 0.061 | 1.764 | 0.983 | 0.061 | 3.000 | 1.40 | 4.95 |
| 3 | 0.065 | 0.131 | 1.608 | 0.935 | 0.131 | 3.000 | 0.72 | 3.48 |
| 4 | 0.032 | 0.132 | 1.740 | 0.901 | 0.132 | 3.000 | 0.93 | 2.21 |
| 5 | 0.052 | 0.192 | 1.599 | 0.860 | 0.192 | 3.000 | 1.50 | 2.21 |
| 6 | 0.095 | 0.122 | 1.500 | 0.973 | 0.122 | 3.000 | 0.44 | 0.77 |
| 7 | −0.025 | 0.070 | 2.030 | 0.905 | 0.070 | 3.000 | 2.69 | 1.43 |
| 8 | −0.040 | 0.141 | 2.020 | 0.818 | 0.141 | 3.000 | 2.54 | 1.07 |
| 9 | 0.075 | 0.100 | 1.600 | 0.975 | 0.100 | 3.000 |  | 1.30 |

The following measurement and evaluation of the acquired samples were performed.

X-Ray Powder Diffraction Analysis

In order to identify crystal phases included in the manufactured samples, X-ray powder diffraction was performed using Ultima-IV (manufactured by Rigaku Corporation) as an X-ray powder diffractometer system and Smart Lab (manufactured by Rigaku Corporation). In X-ray powder diffraction, Cu k-α1 radiation having a wavelength of 1.5405 Å in X-rays was used. X-ray powder diffraction was performed at diffraction angles (2θ) with a step size of 0.01° within the range of 10° to 50°.

Measurement of Lithium Ionic Conductivity

In measurement of lithium ionic conductivity, a pressed cell in which jigs (pins) formed of SUS were installed on and under a container formed of a resin was used. Each sample was put into the container provided with the pins installed on one surface of the pressed cell, was leveled by inserting the pins from the other surface, and was temporarily molded by applying a pressure of about 5 MPa thereto. A sample for measurement having electrodes formed on both surfaces thereof was manufactured by dispersing gold powder on both surfaces of the temporarily molded sample and applying a pressure of about 15 MPa thereto. In order to measure the lithium ionic conductivity of the sample for measurement, Solartron 1260 (manufactured by Solartron Metrology Lid.), which is an impedance/gain-phase analyzer was used. The AC impedance of the sample for measurement was measured within a frequency range about 1 Hz to 3 MHz, at a pressure of about 10 my and at a temperature of about 25° C., and the ion conductivity of the sample for measurement was calculated from the measured AC impedance.

Charging and Discharging Test at Constant Current

In the charging and discharging test, an all-solid-state lithium ion secondary battery was formed by putting the sulfide solid electrolyte material #1 ($Li_{1.82}SiP_{0.036}S_3$), acquired as a lithium ionic conductive solid electrolyte in one example, into a pressed cell, stacking a cathode active material layer including $LiNi_{0.6}Co_{0.2}Mn_{0.2}O_2$ coated with $LiNbO_3$ as a cathode active material on one surface of the cell, and stacking an anode active material including $Li_4Ti_5O_{12}$ as an anode active material on the other surface of the cell. The charging and discharging test of the battery was performed at 1/10 C(=18 mA/g) and at a temperature of about 30° C.

Evaluation

[X-Ray Powder Diffraction Analysis]

Figure 7:
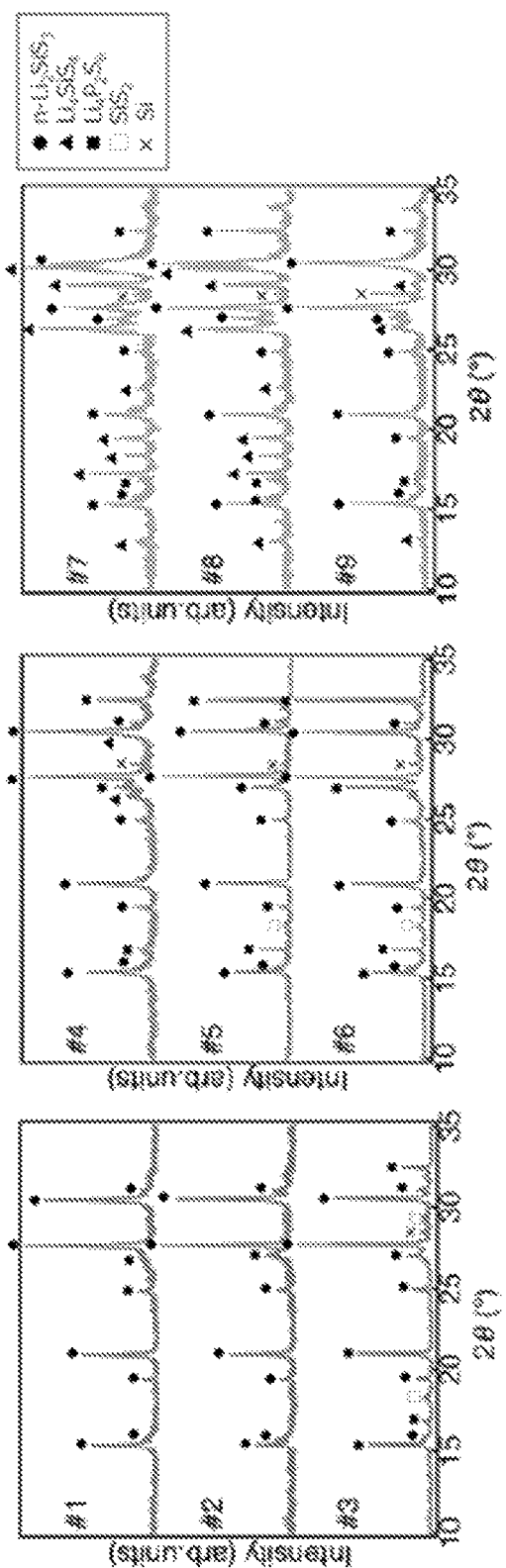
FIG. 7 shows results of X-ray diffraction analysis of sulfide solid electrolyte materials according to an exemplary embodiment of the present invention.

X-ray diffraction (XRD) was performed over the above-acquired sulfide solid electrolyte materials. FIG. 7 shows results of X-ray diffraction analysis. It may be confirmed that the sulfide solid electrolyte materials #1 to #9, which are within the composition range according to the present invention, had peaks (·) indicating the novel crystal structure.

[Measurement of Li Ion Conductivity]

Figures 8A, 8B:
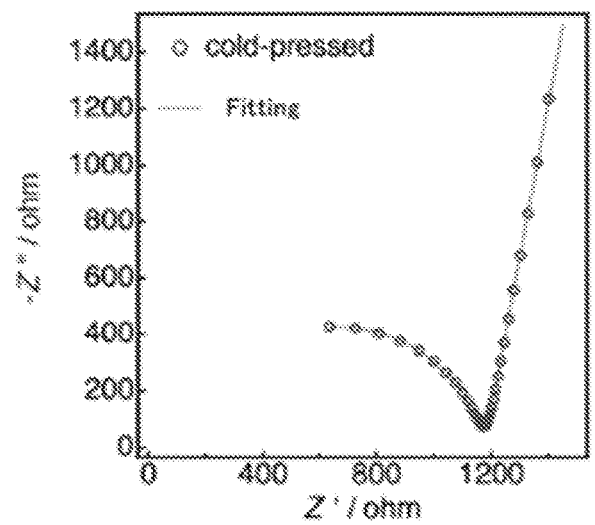
FIG. 8A shows a graph representing results of measurement of the ionic conductivity of the sulfide solid electrolyte material according to an exemplary embodiment of the present invention.
FIG. 8B shows a table representing results of measurement of the ionic conductivity of the sulfide solid electrolyte material according to an exemplary embodiment of the present invention.

The lithium ionic conductivity of the compressed powder of the sulfide solid electrolyte material #1 ($Li_{1.82}SiP_{0.036}S_3$), acquired by the above-described AC impedance measurement method, is set forth in FIG. 8B. It may be confirmed that the sulfide solid electrolyte material #1 ($Li_{1.82}SiP_{0.036}S_3$) according to the present invention, acquired by heating (firing) at a temperature of 460° C., had a higher lithium ionic conductivity of about $6.5 \times 10^{-4}$ S/cm@25° C. than those of equilibrium-$Li_2SiS_3$ and metastable-$Li_2SiS_3$, which are conventionally known, by one digit or more. Table 1 represents the lithium ionic conductivities of the respective samples, i.e., the sulfide solid electrolyte materials #1 to #9, acquired by heating (firing) at a temperature of about 300° C. and/or 500° C.

[Charging and Discharging Test at Constant Current]

Figure 9A:
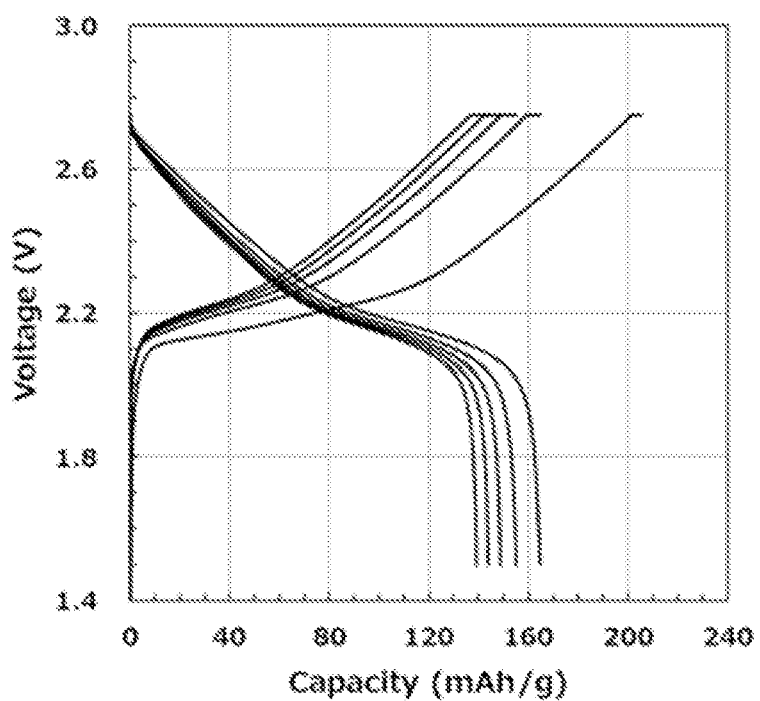
FIG. 9A shows a graph representing results of a constant current charging and discharge test of the sulfide solid electrolyte material according to an exemplary embodiment of the present invention.
Figure 9B:
FIG. 9B shows a table representing results of a constant current charging and discharge test of the sulfide solid electrolyte material according to one embodiment of the present invention.

In the charging and discharging test, the all-solid-state lithium ion secondary battery was formed using the above-acquired sulfide solid electrolyte material #1 ($Li_{1.82}Si_{0.036}S_3$) as an electrolyte layer between the cathode active material layer and the anode active material layer. FIG. 9A is a graph representing the charge and discharge curves of the battery when the battery is charged and discharged. The all-solid-state lithium ion secondary battery using the sulfide solid electrolyte material according to the present invention was able to be charged and discharged, and was able to be operated without any problems. Further, the sulfide solid electrolyte material according to an exemplary embodiment of the present invention had high electrochemical stability and was able to function as a solid electrolyte for all-solid-state batteries.

As is apparent from the above description, provided is a novel sulfide solid electrolyte material which includes silicon (Si), which is naturally abundant, and has good lithium ion conductivity, and a manufacturing method thereof. Further, the sulfide solid electrolyte material according to various exemplary embodiments of the present invention may be used as a material for batteries, thereby being capable of producing a battery having high lithium ionic conductivity.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A solid electrolyte material comprising a sulfide compound having a formula of $Li_{2-4x-y}Si_{1+x-y}P_yS_3$,
    wherein x and y satisfy conditions $-0.040 \leq x \leq 0.095$ and $0.036 \leq y \leq 0.192$.

2. The solid electrolyte material of claim 1, wherein the solid electrolyte material has peaks at diffraction angles (2θ) of at least 15.43°±0.50°, 15.62°±0.50°, 19.49°±0.50°, 20.98°±0.50°, 24.94°±0.50°, 26.99°±0.50°, 27.68°±0.50°, 30.47°±0.50°, 31.04°±0.50°, and 39.55°±0.50° through X-ray powder diffraction using Cu k-al radiation having a wavelength of 1.5405 Å in X-rays.

3. The solid electrolyte material of claim 1, having ionic conductivity of about $4.0 \times 10^{-5}$ S/cm or greater at a temperature of 25° C.

4. A battery comprising a cathode active material layer, comprising:
    a cathode active material,
    an anode active material layer comprising an anode active material, and
    an electrolyte layer interposed between the cathode active material layer and the anode active material layer,
    wherein at least one of the cathode active material layer, the anode active material layer and the electrolyte layer comprises the solid electrolyte material of claim 1.

5. A vehicle comprising a battery of claim 4.

6. A method of manufacturing a solid electrolyte material of claim 1, comprising:
    preparing an amorphized ionically conductive material by mechanically milling; and
    heating the amorphized ionically conductive material.

7. The method of claim 6, wherein, in heating the amorphized ionically conductive material, the amorphized ionically conductive material is heated within a temperature range of about 300° C. to 500° C.

* * * * *